(12) United States Patent
Barb et al.

(10) Patent No.: US 7,270,518 B2
(45) Date of Patent: Sep. 18, 2007

(54) STEEP ANGLE TURBINE COVER BUCKETS HAVING RELIEF GROOVES

(75) Inventors: Kevin Joseph Barb, Halfmoon, NY (US); Robert Edward Deallenbach, Schenectady, NY (US); William Hunter Boardman, IV, Burnt Hills, NY (US)

(73) Assignee: General Electric Company, Schnectady, NY (US)

( * ) Notice: Subject to any disclaimer, the term of this patent is extended or adjusted under 35 U.S.C. 154(b) by 77 days.

(21) Appl. No.: 11/132,391

(22) Filed: May 19, 2005

(65) Prior Publication Data

US 2006/0263213 A1    Nov. 23, 2006

(51) Int. Cl.
*F01D 5/22* (2006.01)

(52) U.S. Cl. ...................................... 416/191

(58) Field of Classification Search ............... 416/190, 416/191, 192, 195, 196 R, 500
See application file for complete search history.

(56) References Cited

U.S. PATENT DOCUMENTS

| 3,107,897 | A | * | 10/1963 | Varadi et al. ............... 416/191 |
| 5,482,435 | A | * | 1/1996 | Dorris et al. ............... 416/191 |
| 5,509,784 | A | | 4/1996 | Carusco et al. |
| 6,030,178 | A | * | 2/2000 | Caruso ....................... 416/191 |

FOREIGN PATENT DOCUMENTS

JP            61-40402 A  *  2/1986  ................. 416/191

* cited by examiner

*Primary Examiner*—Edward K. Look
*Assistant Examiner*—Devin Hanan
(74) *Attorney, Agent, or Firm*—Nixon & Vanderhye, P.C.

(57) ABSTRACT

Steam turbine bucket covers have forward and aft clearance surfaces on a pressure side edge of the cover, a contact surface between the clearance surfaces and an undercut fillet between the forward clearance surface and the contact surface. The adjoining bucket cover has forward and aft clearance surfaces, a contact surface between the clearance surfaces and an outside radius between the forward clearance surface and the contact surfaces along the suction side edge of the cover. The undercut fillet includes two different radii to minimize or eliminate fretting damage caused by high stresses in the interference fit between the contact surfaces of adjacent covers.

11 Claims, 2 Drawing Sheets

STEEP ANGLE TURBINE COVER BUCKETS HAVING RELIEF GROOVES

The present invention relates to steep angle cover buckets overlying airfoils mounted on a turbine rotor wheel and particularly relates to a groove formed at the inner corner of a steep angle bucket cover adjacent the contact surface on the pressure side of the cover edge to relieve static and dynamic stresses thereby to eliminate or minimize the potential for fretting induced high cycle fatigue cracking.

BACKGROUND OF THE INVENTION

In prior U.S. Pat. No. 5,509,784, issued Apr. 23, 1996, a plurality of steep angle bucket covers are disclosed. The covers are integral with the airfoils of the buckets and the buckets, of course, are mounted in a circumferential array about a turbine wheel. The bucket covers include forward and aft clearance surfaces which extend generally parallel to the axis of rotation of the turbine rotor and which lie on opposite sides of the airfoil of the bucket. Intermediate the clearance surfaces are contact surfaces and a radii. It will be appreciated that the adjacent covers on the opposite sides of each bucket include substantially complementary shaped cover edges whereby the clearance surfaces are circumferentially spaced from one another and the contact surfaces contact one another during turbine operation. The contact surfaces of the adjoining covers have interference fits which cause and maintain a coupling between the covers during operation. That is, the covers are biased such that the contact surfaces of the adjoining covers are maintained in contact with one another. This, however, applies a stress to the covers which has the potential to cause high cycle fatigue cracks along the covers. Analysis of the potential problem has indicated that the high cycle fatigue cracks are a function of fretting fatigue on the pressure side of the cover's contact surface. The cracks are initiated on the pressure side contact surface at a location adjacent the inner corner radius between the clearance surfaces where the mating suction side cover contact surface separates from the pressure side contact surface. Accordingly, there is a need to relieve, eliminate or dramatically reduce the potential for such fretting and cracking.

BRIEF DESCRIPTION OF THE INVENTION

In a preferred embodiment of the present invention there is provided a bucket for a turbine comprising: an airfoil having pressure and suction sides and a cover overlying the airfoil; the cover having axially spaced clearance surfaces along a side edge of the cover adjacent the pressure side of the airfoil, a contact surface intermediate the clearance surfaces and an undercut fillet between the contact surface and one of the clearance surfaces.

In a further preferred embodiment of the present invention there is provided a plurality of buckets arranged in a circumferential array thereof about an axis of a turbine, each bucket including an airfoil having pressure and suction sides and a cover overlying the airfoil; each the cover having axially spaced clearance surfaces along a side edge of the cover adjacent the pressure side of the airfoil, a contact surface intermediate the clearance surfaces and an undercut fillet between the contact surface and an axially forward one of the clearance surfaces; each said cover having axially spaced clearance surfaces along an opposite side edge of the cover adjacent the suction side of the airfoil, a contact surface intermediate the suction side clearance surfaces and an outside radius between the suction side contact surface and an axially forward clearance surface thereof; the contact surfaces of the adjacent covers lying in contact with one another, the clearance surfaces of the adjacent covers being spaced circumferentially one from the other and the undercut fillet of each cover lying in spaced registration with the outside radius of the adjacent cover.

DETAILED DESCRIPTION OF THE INVENTION

Figure 1:
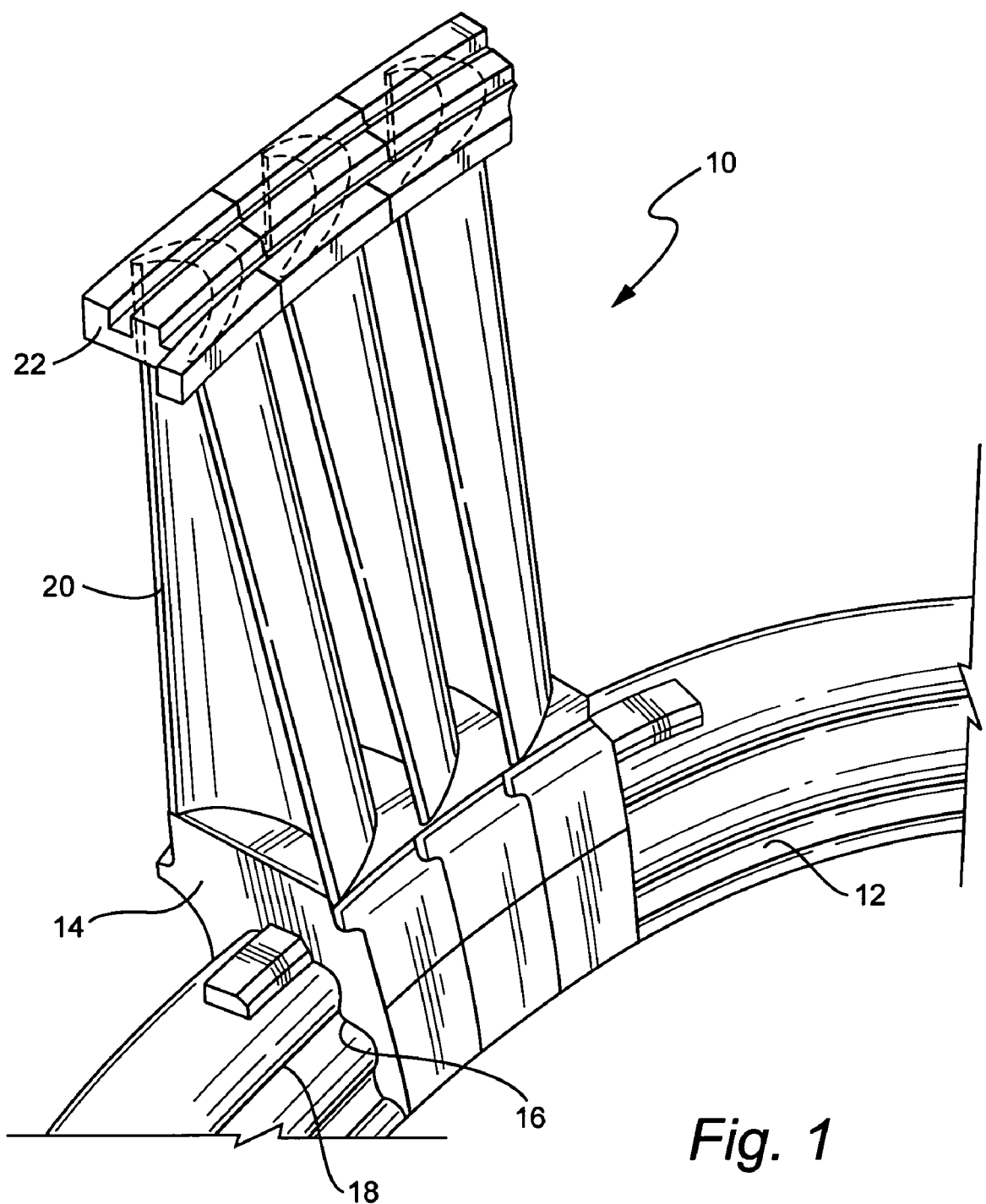
FIG. 1 is a partial perspective view of a turbine rotor wheel with buckets mounted thereon, the buckets having covers constructed in accordance with a preferred aspect of the present invention.

Referring now to the drawings, particularly to FIG. 1, there is illustrated a plurality of turbine buckets generally designated 10 secured to a turbine rotor wheel 12. The buckets 10 are spaced one from the other in a circumferential array a full 360° about the turbine wheel 12. Each bucket is identical with the exception of a notch blade bucket, not shown, which can have a larger interference fit or tangential width and two buckets, also not shown, adjacent the notch blade which differ only in the dovetail area. Each bucket 10 includes a dovetail 14 having the shape of a pine tree slot 16 for mating and sliding engagement with a complementary dovetail shape 18 on the rim of the rotor wheel 12. Buckets 10 are added to the rotor wheel 12 via a radial filling slot, not shown, formed in the wheel rim by inserting the dovetail radially inwardly into the slot and sliding the bucket tangentially along the rim of the wheel.

Figure 2:
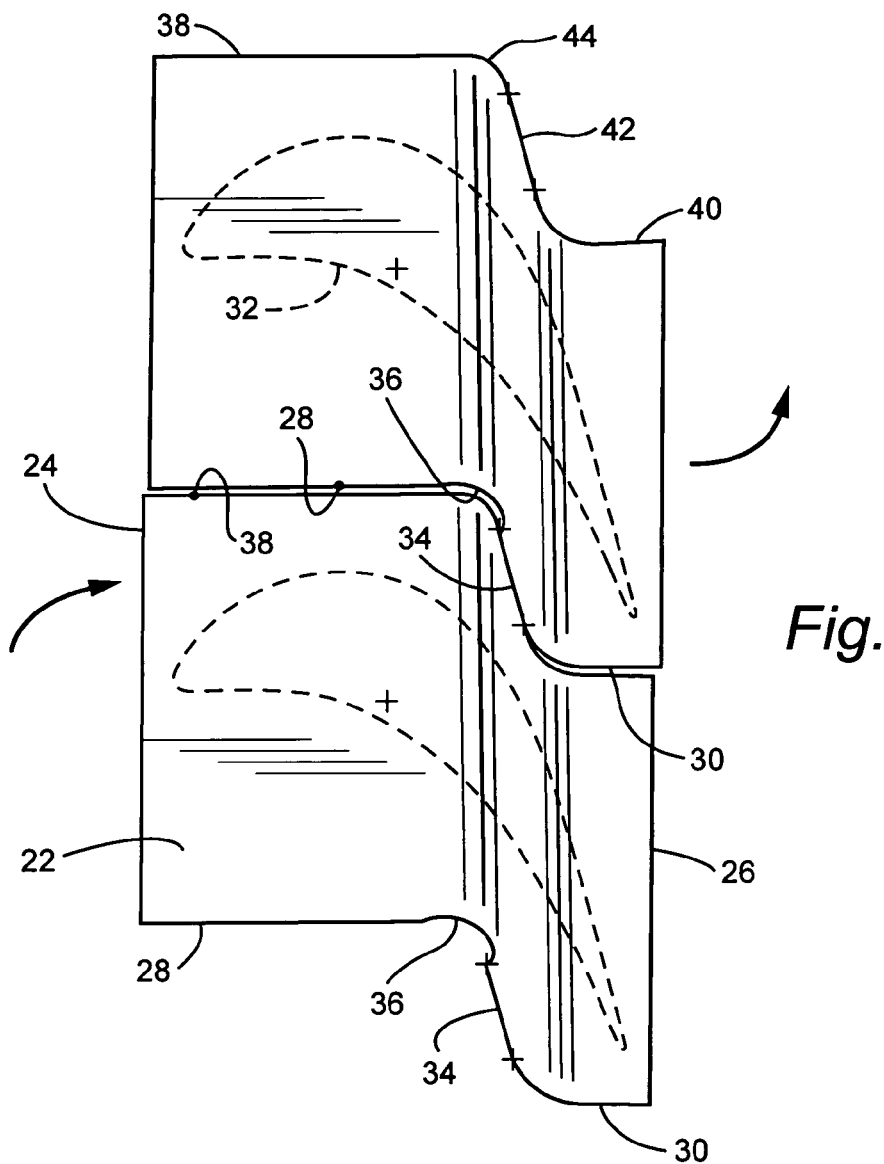
FIG. 2 is a radial inward view of a pair of adjoining covers illustrating their orientation vis à vis the bucket airfoil and the contact and clearance surfaces between adjacent covers.

Each bucket 10 in addition to the dovetail 14 includes an airfoil 20 terminating at its distal end in a bucket cover 22. Bucket covers 22 are preferably formed integrally with the buckets 10. Each cover is identical to one another and a description of one will suffice for a description of all of the bucket covers. Referring to FIG. 2, each bucket cover includes a leading edge 24, a trailing edge 26, forward and aft clearance surfaces 28 and 30 adjacent the respective leading and trailing edges 24 and 26 and along a side edge of the cover adjacent the pressure side 32 of the airfoil 20. Between the clearance surfaces 28 and 30 and along the pressure side of each cover 22 is a contact surface 34 and an undercut fillet 36. Along the opposite edge of the cover there are also provided clearance surfaces 38 and 40 adjacent the leading and trailing edges 24 and 26 respectively. Additionally, between the clearance surfaces 38 and 40 along the cover edge adjacent the suction side of the airfoil there is provided a contact surface 42 and an outside radius 44.

It will be appreciated from a review of FIG. 2 that the pressure side edge i.e. surfaces 28, 30, 34 and fillet 36, of each cover 22 is generally complementary in shape to the suction side edge, i.e. surfaces 38, 40, 42 and radius 44, of the adjoining cover, with the exception of the undercut fillet 36 and the outer radius 44 of the respective pressure and suction sides of the covers. As illustrated, the clearance surfaces 28 and 38 of the adjoining covers are spaced circumferentially one from the other in normal operation of the turbine. Likewise, the clearance surfaces 30 and 40 of adjoining covers are spaced one from the other during normal operation of the turbine. Contact surfaces 34 and 42 engage one another during normal operation, i.e. those surfaces have an interference fit whereby the covers are maintained engaged one with the other during normal turbine operation. As noted in prior U.S. Pat. No. 5,509,784, the interference fit between the adjacent covers causes rotation, i.e., a pretwist of the covers and airfoil tips about the bucket radius during assembly. This causes development of stresses along the cover contact surfaces. Due to the cover geometry, relatively high contact pressure is developed at the contact surface locations and fretting damage may develop on the pressure side contact surfaces at or near this region and may propagate as fatigue cracks since relatively high static and dynamic bending stresses may act at the fretted material.

The present invention eliminates or reduces the potential for fretting fatigue cracking on the pressure side contact surfaces 34 by introducing an undercut relief groove, i.e. providing an undercut fillet 36 between the contact surface 34 and the clearance surface 28 on the pressure side of the cover causing a shift of stresses away from the contact surface and therefore away from any fretting damage. The term undercut fillet as used herein means one or more radii between linear surfaces wherein tangents of the radii at the juncture of the radii and the linear surfaces are not coincident with the linear surfaces.

Figure 3:
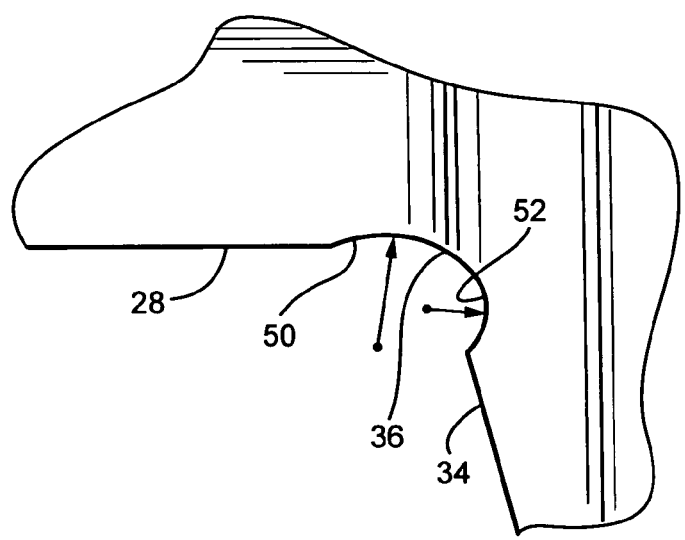
FIG. 3 is an enlarged fragmentary radial inward view of the undercut fillet between the forward clearance surface and contact surface on the pressure side of the cover in accordance with a preferred aspect of the present invention.

In a preferred aspect of the present invention, the fillet 36 is a compound fillet having different radii extending between the forward clearance surface 28 and the contact surface 34 on the pressure side of the cover edge. Referring to FIG. 3, a larger radius 50 adjoins the clearance surface 28 and a smaller radii 52 adjoins the larger radius 50 and the contact surface 34. As illustrated, the juncture between the larger radius 50 and the clearance surface 28 has a tangent of the radius non-parallel or coincident with the clearance surface 28. Similarly, the juncture of the small radius 52 with the contact surface 34 has a tangent non-parallel or coincident to the contact surface 34. The two different radii 50, 52 are blended at their juncture. By utilizing a compound fillet 36 comprising large and small radius sections, stresses are minimized or eliminated. A small radius, combined with a large radius, in the fillet enables preservation of the extent of the contact surface (otherwise the large radius would eliminate a substantial portion of the contact surface) while reducing the potential for propagation of small cracks formed by fretting. Additionally, by making a generally or a substantially 90° intersection with the contact surface 34, the smaller radius substantially eliminates the stress associated with the bending of the back of the cover. The larger radius toward the leading edge of the cover controls the concentrated bending stress in the cover at the location of the large radius while the small radius decouples the fretting action eliminating bending stress in that zone because of the cover geometry. It will be appreciated that the suction side edge of the cover has lower bending stresses and consequently a much lower potential for fretting fatigue. While the foregoing undercut fillet is described herein as applied to steep angle bucket covers, preferably integral covers, having contact surface angles between 10°-20° relative to the circumferential plane of rotation of the bucket, it may also be useful in non-steep angle bucket covers, i.e. contact surfaces making angles in excess of 20° with the circumferential plane of rotation.

The general concept of using a relief groove to reduce or eliminate the potential for fretting fatigue is known. However, it has not been applied to bucket covers or to steep angle integral bucket covers. Rather it has been applied to other aspects of turbine shafts, i.e., to eliminate fretting fatigue under shrunk-on wheels and couplings. One known exception is a relief radius applied to low pressure cover buckets and to Z-lock bucket shrouds in aircraft engines. These relief radii however are generally introduced to increase contact surface length and to enlarge the corner radius between the shroud contacting clearance surfaces to reduce fillet stresses. Generally, these relief radii undercut the clearance surfaces but not the contacting surface. Also, Z-lock buckets generally employ a hard coating on the contact surfaces to protect against wear and degradation of the surfaces. However, hard coatings are costly and involve potential issues with coating spallation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bucket for a turbine comprising:
   an airfoil having pressure and suction sides and a cover overlying the airfoil;
   said cover having axially spaced clearance surfaces along a side edge of the cover adjacent the pressure side of the airfoil, a contact surface intermediate said clearance surfaces and an undercut fillet between said contact surface and one of said clearance surfaces wherein said fillet comprises a compound fillet formed of different radii.

2. A bucket according to claim 1 wherein a larger radius of said undercut compound fillet lies adjacent said one clearance surface and a smaller radius of said undercut compound fillet lies adjacent said contact surface.

3. A bucket according to claim 2 wherein said larger radius is located forwardly in a direction toward a leading edge of the cover relative to a location of said smaller radius.

4. A bucket according to claim 3 wherein said smaller radius of said compound fillet intersects the contact surface generally at a right angle.

5. A bucket according to claim 4 wherein said contact surface extends at an angle between 10°-20° relative to a circumferential plane of rotation of the bucket in the turbine.

6. A bucket according to claim 1 wherein said bucket and said cover are integrally formed relative to one another.

7. A plurality of buckets arranged in a circumferential array thereof about an axis of a turbine, each bucket including an airfoil having pressure and suction sides and a cover overlying the airfoil;
   each said cover having first and second axially spaced clearance surfaces along a side edge of the cover adjacent the pressure side of the airfoil, a first contact surface intermediate said first and second axially spaced clearance surfaces and an undercut fillet between said first contact surface and an axially forward one of said first and second clearance surfaces;
   each said cover having third and fourth axially spaced clearance surfaces along an opposite side edge of the cover adjacent the suction side of the airfoil, a second contact surface intermediate said third and fourth axially spaced clearance surfaces and an outside radius between said second contact surface and an axially forward one of said third and fourth axially spaced clearance surfaces;

said contact surfaces of said adjacent covers lying in contact with one another, said clearance surfaces of the adjacent covers being spaced circumferentially one from the other and the undercut fillet of each cover lying in spaced registration with the outside radius of the adjacent cover, and wherein each said fillet comprises a compound fillet of different radii.

8. A plurality of buckets according to claim 7 wherein each said undercut fillet includes a larger radius lying adjacent said one axially forward clearance surface along said pressure side of the cover and a smaller radius of said undercut compound fillet lies between said pressure side contact surface and said larger radius.

9. A plurality of buckets according to claim 8 wherein said larger radius is located forwardly in a direction toward a leading edge of the cover relative to the location of the smaller radius.

10. A plurality of buckets according to claim 9 wherein each said contact surface extends at an angle between 10°-20° relative to a circumferential plane of rotation of the buckets in the turbine.

11. A plurality of buckets according to claim 10 wherein each said bucket and said cover are integrally formed relative to one another.

* * * * *